US008032284B2

(12) United States Patent
Hozumi et al.

(10) Patent No.: US 8,032,284 B2
(45) Date of Patent: Oct. 4, 2011

(54) SEAT APPARATUS FOR VEHICLE

(75) Inventors: Soichiro Hozumi, Nagoya (JP); Toshiro Maeda, Anjo (JP); Koji Hattori, Toyota (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 931 days.

(21) Appl. No.: 11/940,664

(22) Filed: Nov. 15, 2007

(65) Prior Publication Data
US 2008/0119996 A1    May 22, 2008

(30) Foreign Application Priority Data

Nov. 21, 2006 (JP) .................................. 2006-313802

(51) Int. Cl.
*G05D 1/00* (2006.01)
(52) U.S. Cl. ................ 701/49; 701/37; 701/45; 296/63; 296/65.01; 297/284.9
(58) Field of Classification Search .................... 701/37, 701/38, 39, 45, 49; 296/63, 65.01; 297/284.9
See application file for complete search history.

(56) References Cited

U.S. PATENT DOCUMENTS

| | | | | |
|---|---|---|---|---|
| 6,199,001 | B1 * | 3/2001 | Ohta et al. ..................... 701/51 |
| 6,470,265 | B1 * | 10/2002 | Tanaka ......................... 701/208 |
| 6,671,596 | B2 * | 12/2003 | Kawashima et al. ........... 701/37 |
| 2003/0023363 | A1 * | 1/2003 | Katz et al. ...................... 701/49 |
| 2005/0077692 | A1 * | 4/2005 | Ogawa ...................... 280/5.517 |

FOREIGN PATENT DOCUMENTS

| | | | |
|---|---|---|---|
| JP | 2750943 | | 2/1998 |
| JP | 2005-88834 | | 4/2005 |
| JP | 2005088834 A | * | 4/2005 |
| JP | 2006218950 A | * | 8/2006 |

OTHER PUBLICATIONS

U.S. Appl. No. 11/934,975, filed Nov. 5, 2007, Soichiro Hozumi, et al.

* cited by examiner

*Primary Examiner* — Thomas Black
*Assistant Examiner* — Peter D Nolan
(74) *Attorney, Agent, or Firm* — Oblon, Spivak, McClelland, Maier & Neustadt, L.L.P.

(57) ABSTRACT

A seat apparatus for controlling a side support portion on the basis of a road shape includes a control program cooperating with a car navigation system, a self-directed control program, a sensor error detecting program, and a map matching error detecting program, wherein, during the side support portion is executed by the control program cooperating with the car navigation system, when the error is detected, the control program cooperating with the car navigation system is changed to the self-directed control program, and during the side support portion is controlled by the self-directed control program, when the error is not detected, the self-directed control program is changed the control program cooperating with the car navigation system.

6 Claims, 14 Drawing Sheets

Retaining control administrating program

Straight portion running program

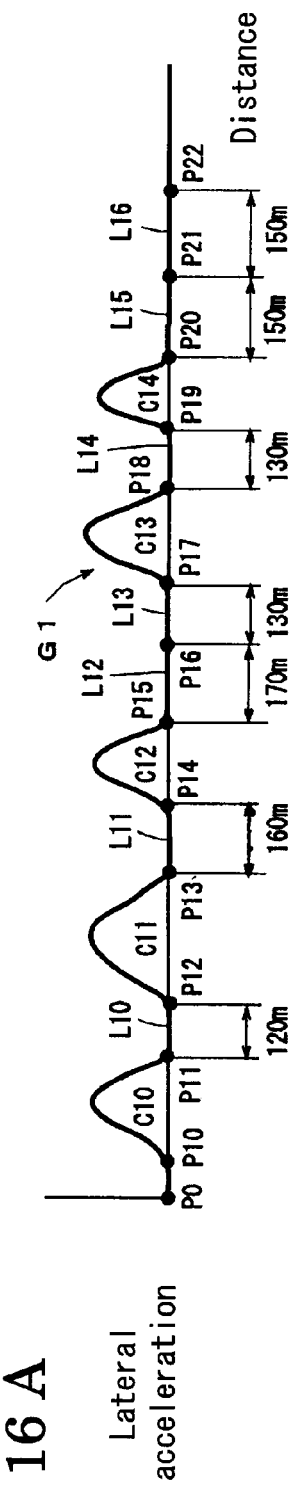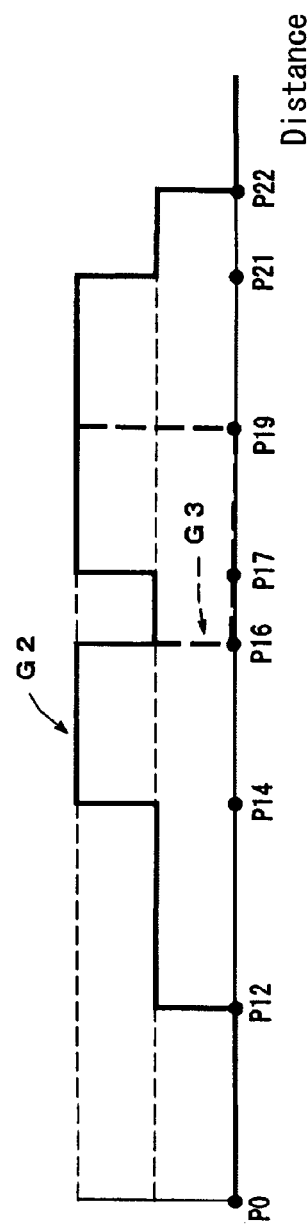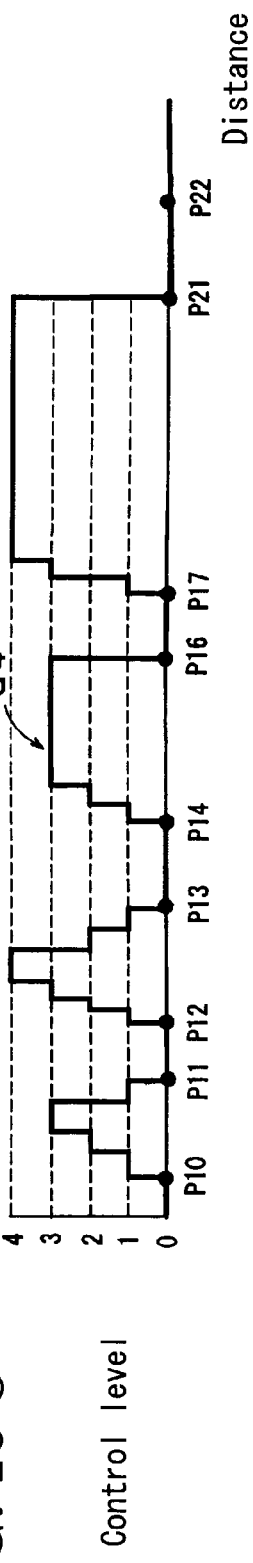
FIG. 16A
FIG. 16B
FIG. 16C

SEAT APPARATUS FOR VEHICLE

CROSS REFERENCE TO RELATED APPLICATIONS

This application is based on and claims priority under 35 U.S.C. §119 to Japanese Patent Application 2006-313802, filed on Nov. 21, 2006, the entire content of which is incorporated herein by reference.

FIELD OF THE INVENTION

The present invention relates to a seat apparatus for a vehicle that controls a side support portion depending on a road shape.

BACKGROUND

A seat apparatus for a vehicle disclosed in JP2750943 is well known. When the vehicle lateral accelerations are continuously detected, the seat apparatus determines that the vehicle is driven on a road having plural curves, such as a winding road, and then a supporting operation is executed. During the supporting operation, the seat apparatus is controlled in order to retain a side support portion to a position where a human body is supported thereby (hereinbelow, referred also to as a supporting position). According to the seat apparatus disclosed in JP2750943, the side support portion is retained to the supporting position without depending on an electronic map data. As a result, an occupant of the vehicle seat may not feel frequent actuations of the supporting operation.

However, because the seat apparatus disclosed in JP2705943 determines that the vehicle is driven on the winding road when the lateral acceleration is continuously generated at the vehicle, when the vehicle is driven on a winding road that has, for example, two curves including a straight portion therebetween, the seat apparatus may continuously retain the side support portion to the supporting position. As a result, even when the vehicle is driven on the straight portion between the curves where the occupant basically needs to be supported less firmly than on the curve, the occupant may still feel firmly pressured by the side support portion.

On the other hand, a vehicle controlling apparatus disclosed in JP2005088834A includes a suspension control device and a navigation device. The navigation device determines that the vehicle is driven on a winding road that has, for example, two curves (e.g., a first curve and a second curve) including a straight portion therebetween, based on electronic map data, and the suspension control device controls a suspension on the basis of the determination of the navigation device. In this configuration, even when the navigation device determines that the vehicle is driven on the straight portion, the suspension is controlled so as to be at a maximum controlling level of the first curve. In other words, according to the vehicle controlling device disclosed in JP2005088834A, when the straight portion exists between the two curves, because the navigation device determines that the vehicle is driven on the winding road based on the electronic map data, the suspension is continuously controlled during the entire winding road. In the light of this configuration, it is conceivable that a side support portion may be controlled in the same manner as the suspension being controlled by the vehicle controlling apparatus.

However, if the side support portion is controlled in the same manner as the suspension control by the vehicle controlling apparatus, when the vehicle is driven on a road where a GPS sensor of the vehicle does not receive signal correctly, or when the vehicle is driven on a road along which another road exists so as to be parallel, the side support portion may not be controlled appropriately.

A need thus exists for a seat apparatus for a vehicle which is not susceptible to the drawback mentioned above.

SUMMARY OF THE INVENTION

According to an aspect of the present invention, a seat apparatus adapted to vehicle for controlling a side support portion on the basis of a road shape, includes a control program cooperating with a car navigation system for controlling the side support portion to be retained on the basis of electronic map data from a car navigation system, a self-directed control program for controlling the side support portion to be retained on the basis of vehicle driving information, a sensor error detecting program for detecting a sensor output error from the car navigation system, and a map matching error detecting program for detecting that a map matching error occurs at the car navigation system, wherein, while the side support portion is controlled so as to be retained by the control program cooperating with the car navigation system, when at least one of the sensor error detecting program and the map matching error detecting program detects the error, the side support portion controlled by the control program cooperating with the car navigation system is changed to be controlled by the self-directed control program, and while the side support portion is controlled so as to be retained by the self-directed control program, when one of the sensor error detecting program and the map matching error detecting program does not detect the error, the side support portion controlled by the self-directed control program is changed to be controlled by the control program cooperating with the car navigation system.

BRIEF DESCRIPTION OF THE DRAWINGS

The foregoing and additional features and characteristics of the present invention will become more apparent from the following detailed description considered with reference to the accompanying drawings, wherein:

FIG. 16A illustrates a graph indicating a lateral acceleration during the self-directed control according to the seat apparatus of the embodiment;

FIG. 16B illustrates a graph indicating the control state during the self-directed control according to the seat apparatus of the embodiment; and FIG. 16C illustrates a graph indicating the control level during the self-directed control according to the seat apparatus of the embodiment.

DETAILED DESCRIPTION

Figure 1:
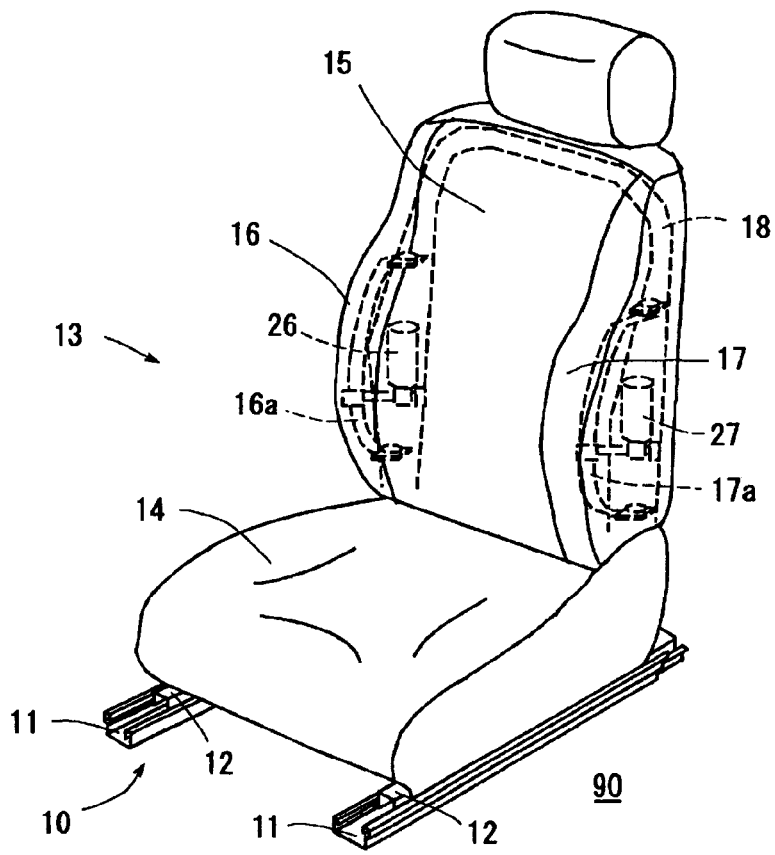
FIG. 1 illustrates a diagram indicating an oblique perspective view of a seat apparatus according to the embodiment.
Figure 2:
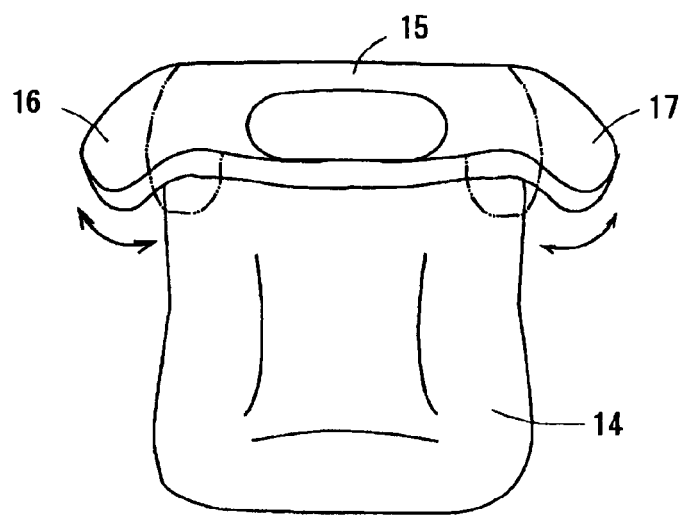
FIG. 2 illustrates a diagram indicating a flat view of a seat apparatus according to the embodiment.

An embodiment of a seat apparatus for a vehicle (hereinafter referred to simply as a seat apparatus) related to the present invention will be described in accordance with the attached drawings. As illustrated in FIG. 1, the seat apparatus includes a seat slide device 10 and a seat 13. The seat slide device 10 includes, for example, a pair of lower rails 11 and a pair of upper rails 12 supported by the lower rails 11 so as to be slidable thereon. The lower rails 11 are fixed on a floor 90 so as to extend in a front-rear direction of the vehicle. Specifically, the seat 13 includes a seat cushion 14 on which an occupant is seated, and a seat back 15 that supports the occupant's back. Further, a right side support portion 16 and a left side support portion 17 are provided at a right and a left portions of the seat back 15 respectively for stabilizing a posture of the occupant by pressing the upper body of the occupant on its sides. Additionally, a right motor 26 and a left motor 27 are provided at a right and a left portions of a seat frame 18 respectively. Each of the right and the left motors 26 and 27 includes a reduction mechanism. Furthermore, a right support frame 16a and a left support frame 17a are adapted to be pivoted by means of the right and the left support motors 26 and 27 respectively. Both right and left support frames 16a and 17a are pivoted by both right and left motors 26 and 27 being driven respectively, and therefore both right and left side support portions 16 and 17 are moved to be in an opened position, which is indicated with a solid line, and to be in a closed position, which is indicated with a chain double-dashed line illustrated in FIG. 2. The right side support portion 16 and the left side support portion 17 each serves as a side support portion.

Figure 3:
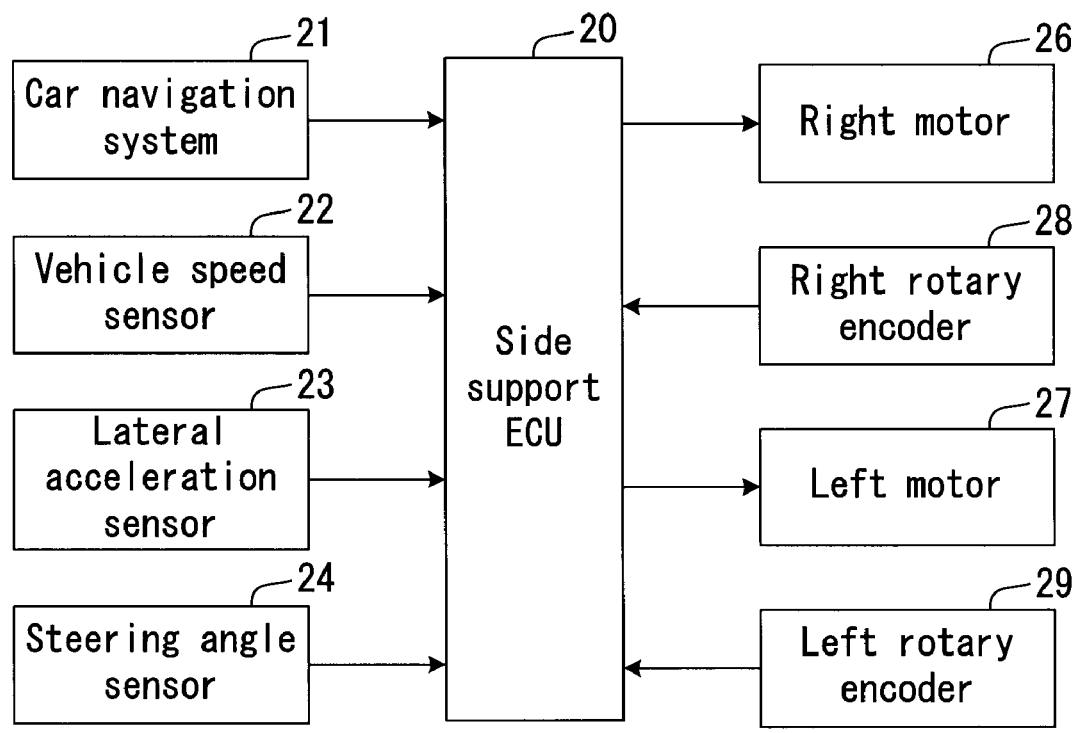
FIG. 3 illustrates an electrical schematic diagram of the seat apparatus according to the embodiment.

FIG. 3 is a chart illustrating electric connections of the seat apparatus. As illustrated in FIG. 3, a vehicle speed sensor 22, a lateral acceleration sensor 23 and a steering angle sensor 24 are connected to a side support electronic control unit 20 (hereinafter referred to as a side support ECU 20). The lateral acceleration sensor 23 detects acceleration generated at the vehicle in a lateral direction thereof when the vehicle turns the curve. In this configuration, a detecting signal detected by each of the vehicle speed sensor 22, the lateral acceleration sensor 23 and the steering angle sensor 24 is inputted to the side support ECU 20. Additionally, a car navigation system 21 is connected to the side support ECU 20, and data such as a location of the vehicle, a moving direction of the vehicle, electronic map data, an error signal of, for example, a GPS sensor, and an error signal indicating that the information related to a current position of the vehicle (GPS information) does not match the electronic map data are successively inputted to the side support ECU 20 from the car navigation system 21. The electronic map data includes information on a radius of a curve located at a predetermined distance ahead in a moving direction of the vehicle. Furthermore, the right motor 26, the left motor 27, a right rotary encoder 28 and a left rotary encoder 29 are connected to the side support ECU 20. In this configuration, the side support ECU 20 outputs driving signals to the right and the left motor 26 and 27. Further, the right and the left rotary encoders 18 and 29 output location signals (feedback signals) for successively feeding back positions of the side support portions 16 and 17 until the side support portions 16 and 17 are retained to a target closing position.

Figure 4:
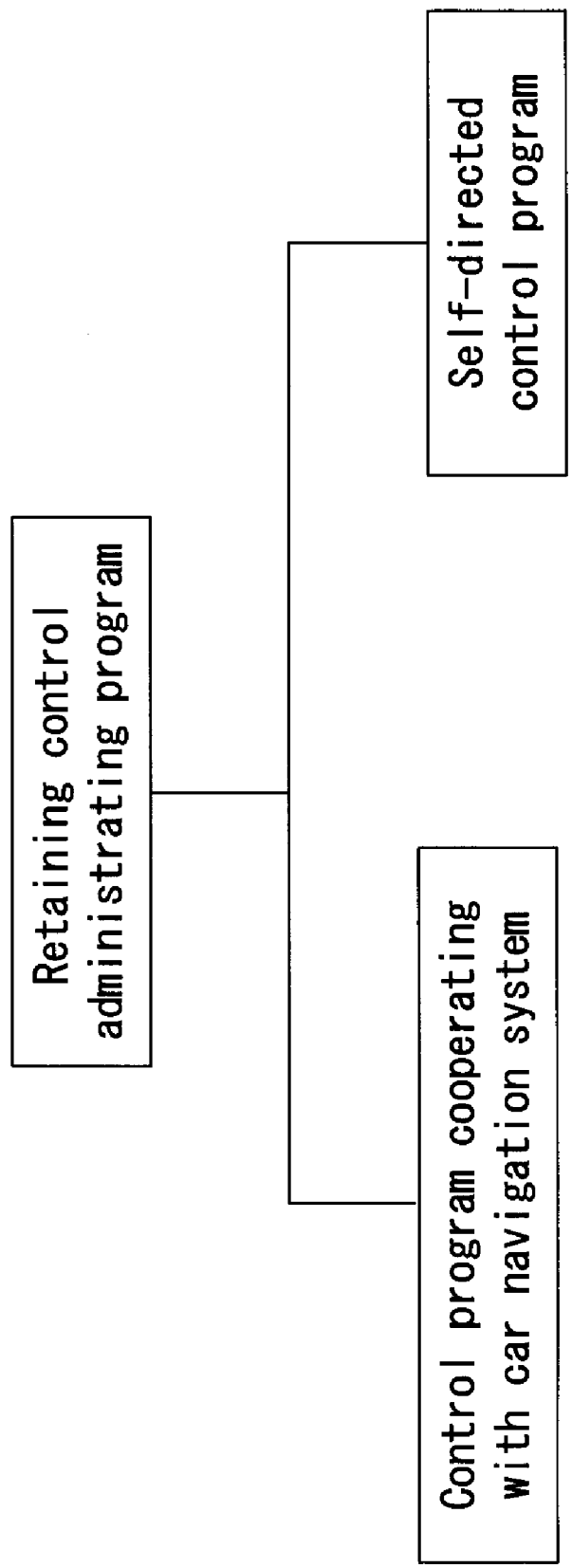
FIG. 4 illustrates a program structure for controlling the seat apparatus according to the embodiment.

FIG. 4 illustrates a configuration of a program for executing the retaining control of the side support portions of the seat apparatus. The retaining control for each of the right and left side support portions 16 and 17 is executed by a retaining control administrating program, a control program cooperating with the car navigation system, and a self-directed control program. Each program is memorized in a ROM of the side support ECU 20. The retaining control administrating program administrates the executions of the control program cooperating with the car navigation system and the self-directed control program. Specifically, the control program cooperating with the car navigation system and the self-directed control program have been simultaneously executed, and the retaining control administrating program determines which control should be used (a control executed by the control program cooperating with the car navigation system or a control executed by self-directed control program). The control program cooperating with the car navigation system determines a necessity to retain the right and left side support portions 16 and 17 on the basis of electronic map data sent from the car navigation system 21. When the control program cooperating with the car navigation system determines that there is a necessity to retain the side support portions, a retaining control is executed for the right and left side support portions 16 and 17. On the other hand, the self-directed control program determines a necessity to retain the right and left side support portions 16 and 17 on the basis of vehicle driving information. When the self-directed control program determines that there is a necessity to retain the side support portions, the retaining control is executed for the right and left side support portions 16 and 17. The vehicle driving information includes a vehicle speed detected by the vehicle speed sensor 22, a lateral acceleration detected by the lateral acceleration sensor 23 and an angle of the wheel detected by the steering angle sensor 24. When the vehicle is driven on the straight portion between curves, each of the right and left side support portions 16 and 17 is retained to a supporting position by means of the retaining control.

Figure 5:
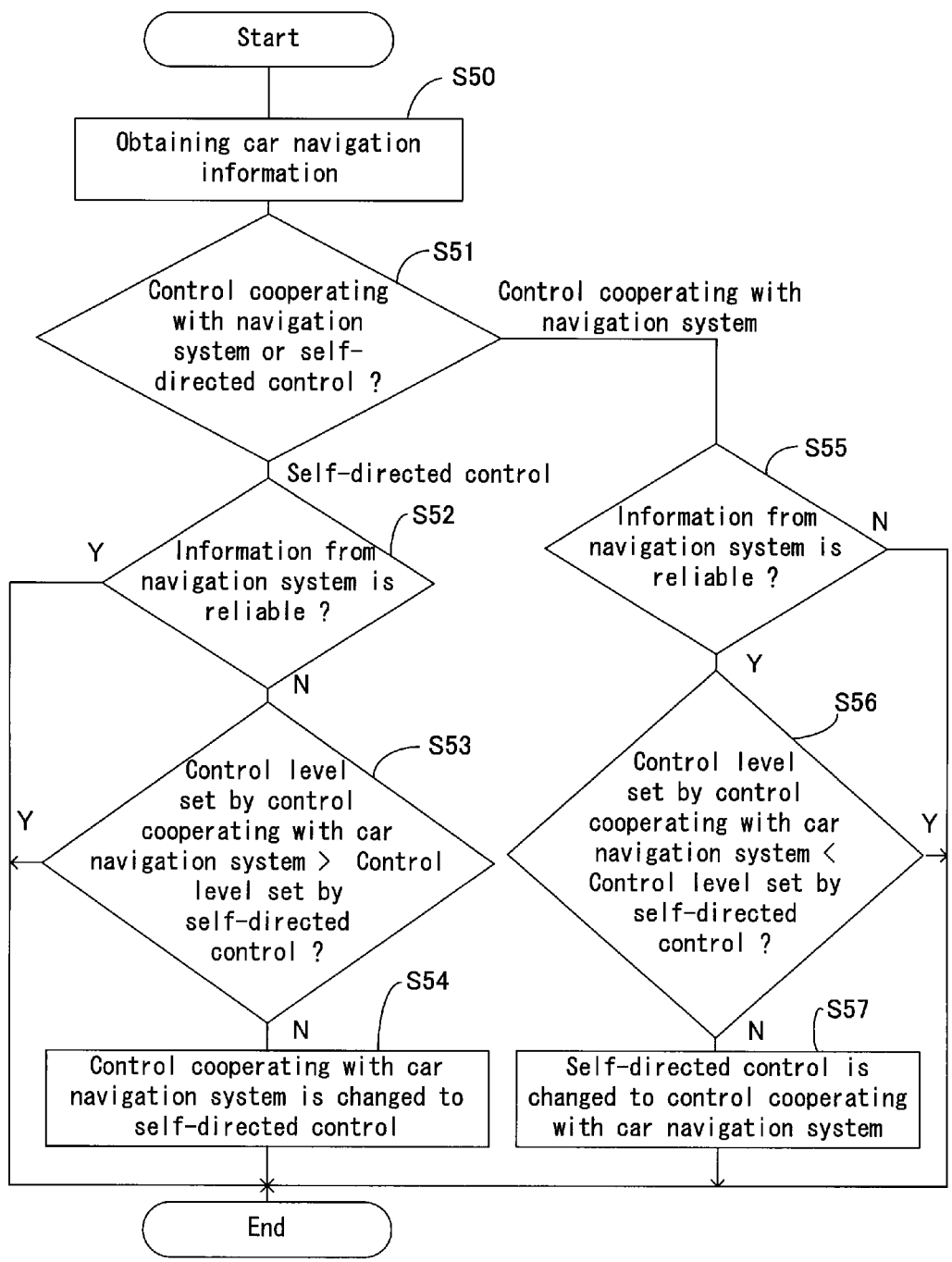
FIG. 5 illustrates a flowchart of a retaining control administrating program used for controlling the seat apparatus according to the embodiment.

FIG. 5 illustrates a flowchart of the retaining control administrating program. The retaining control administrating program is repeatedly executed every predetermined time counted by a software timer. Once the retaining control administrating program is executed, the side support ECU 20 obtains car navigation information from the car navigation system 21 in Step S50. The car navigation information includes an error signal of, for example, a GPS sensor and an error signal indicating that the GPS information does not match the electronic map data of the car navigation system 21. In Step S51, the side support ECU 20 checks that the control cooperating with the car navigation system or the self-directed control is used. If the control cooperating with the car navigation system is used, the side support ECU 20 proceeds to Step S52. On the other hand, if the self-directed control is used, the side support ECU 20 proceeds to Step S55.

In Step S52, the side support ECU 20 determines whether or not the information from the car navigation system 21 is reliable. If the information includes at least one of the error signal of the GPS sensor and the error signal indicating that the GPS information does not match the electronic map data of the car navigation system 21 (NO), the side support ECU 20 determines that the information from the car navigation system 21 is not reliable, and the side support ECU 20 proceeds to Step S53. On the other hand, if the information does not include the error signal of the GPS sensor and the error signal indicating that the GPS information does not match the electronic map data of the car navigation system 21 (YES), the side support ECU 20 determines that the information from the car navigation system 21 is reliable, and the retaining control administrating program is terminated. Then, the retaining control is executed for the right and left side support portions 16 and 17 by the control cooperating with the car navigation system. Step S52 serves as a sensor error detecting means and a map matching error detecting means together with Step S55.

In Step S53, the side support ECU 20 determines whether or not the control level for the right and left side support portions 16 and 17 set by the control cooperating with the car navigation system is larger than the control level for the right and left side support portions 16 and 17 set by the self-directed control. If the control level set by the control cooperating with the car navigation system is larger than the control level set by the self-directed control (YES), the retaining control administrating program is terminated. Then the retaining control for the right and left side support portions 16 and 17 is continuously executed by the control cooperating with the car navigation system. On the other hand, the control level set by the self-directed control is equal to or larger than the control level set by the control cooperating with the car navigation system (NO), the side support ECU 20 proceeds to Step S54.

In Step S54, the control cooperating with the car navigation system is changed to the self-directed control, and the retaining control administrating program is terminated.

In Step S55, the side support ECU 20 determines whether or not the information from the car navigation system 21 is reliable. If at least one of the error signal of the GPS sensor and the error signal indicating that the GPS information does not match the electronic map data of the car navigation system 21 is not included in the information (YES), the side support ECU 20 determines that the information from the car navigation system 21 is reliable, and the side support ECU 20 proceeds to Step S56. On the other hand, if the side support ECU 20 determines that one of the error signals is included (NO), the side support ECU 20 determines that the information from the car navigation system 21 is not reliable, and the retaining control administrating program is terminated. Then, the retaining control is continuously executed for each of the right and left side support portions 16 and 17 by the self-directed control. Step S55 serves as a sensor error detecting means and a map matching error detecting means together with Step S52.

In Step S56, the side support ECU 20 determines whether or not the control level for the right and left side support portions 16 and 17 set by the self-directed control is larger than the control level for the right and left side support portions 16 and 17 set by the control cooperating with the car navigation system. If the control level set by self-directed control is larger than the control level set by the control cooperating with the car navigation system (YES), the retaining control administrating program is terminated. Continuously, the retaining control for the right and left side support portions 16 and 17 is executed by the self-directed control. On the other hand, if the control level set by the control cooperating with the car navigation system is equal to or larger than the control level set by the self-directed control (NO), the side support ECU 20 proceeds to Step S57.

In Step S57, the self-directed control is changed to the control cooperating with the car navigation system, and the retaining control administrating program is terminated.

Figure 6:
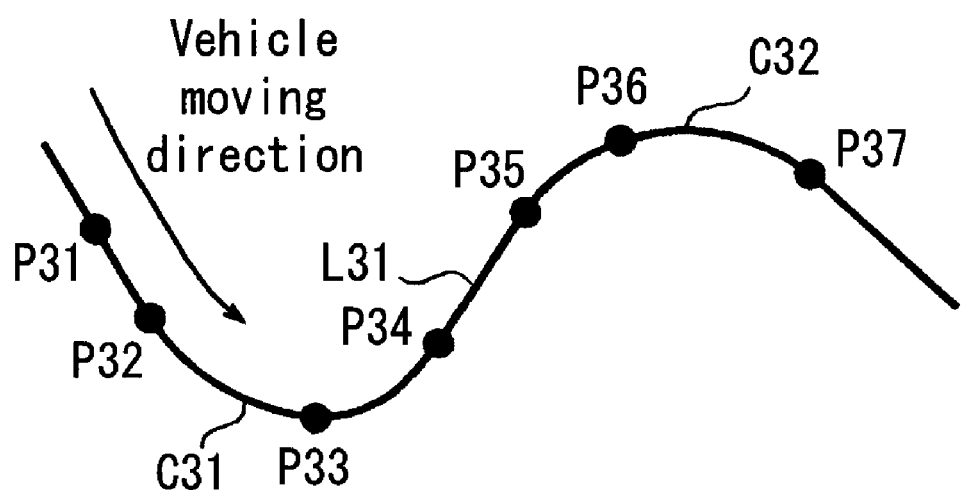
FIG. 6 illustrates a diagram indicating a road on which the vehicle is driven on the basis of a control cooperating with the car navigation system according to the seat apparatus of the embodiment.

Next, the control program cooperating with the car navigation system will be explained in detail. It is assumed that a vehicle is driven on a road illustrated in FIG. 6 in a vehicle moving direction illustrated with an arrow. In FIG. 6, C31 indicates a first curve, and C32 indicates a second curve. In other words, when the vehicle is driven before reaching the control starting point P31, the first curve C31 exists before the vehicle reaches the second curve C32. Further, P32 indicates a starting point of the first curve C31, P33 indicates a position where the first curve C31 has a minimum radius, P34 indicates an ending point of the first curve C31, P35 indicates a starting point of the second curve C32, P36 indicates a point where the second curve C32 has a minimum radius, and P37 indicates an ending point of the second curve C32. Further, L1 indicates a straight portion between the ending point P34 of the first curve C31 and a starting point P35 of the second curve C32. P31 is a control starting point located two second before the starting point P32 of the first curve C31. At that point in time, the vehicle is driven before reaching the control starting point P31.

Figure 7:
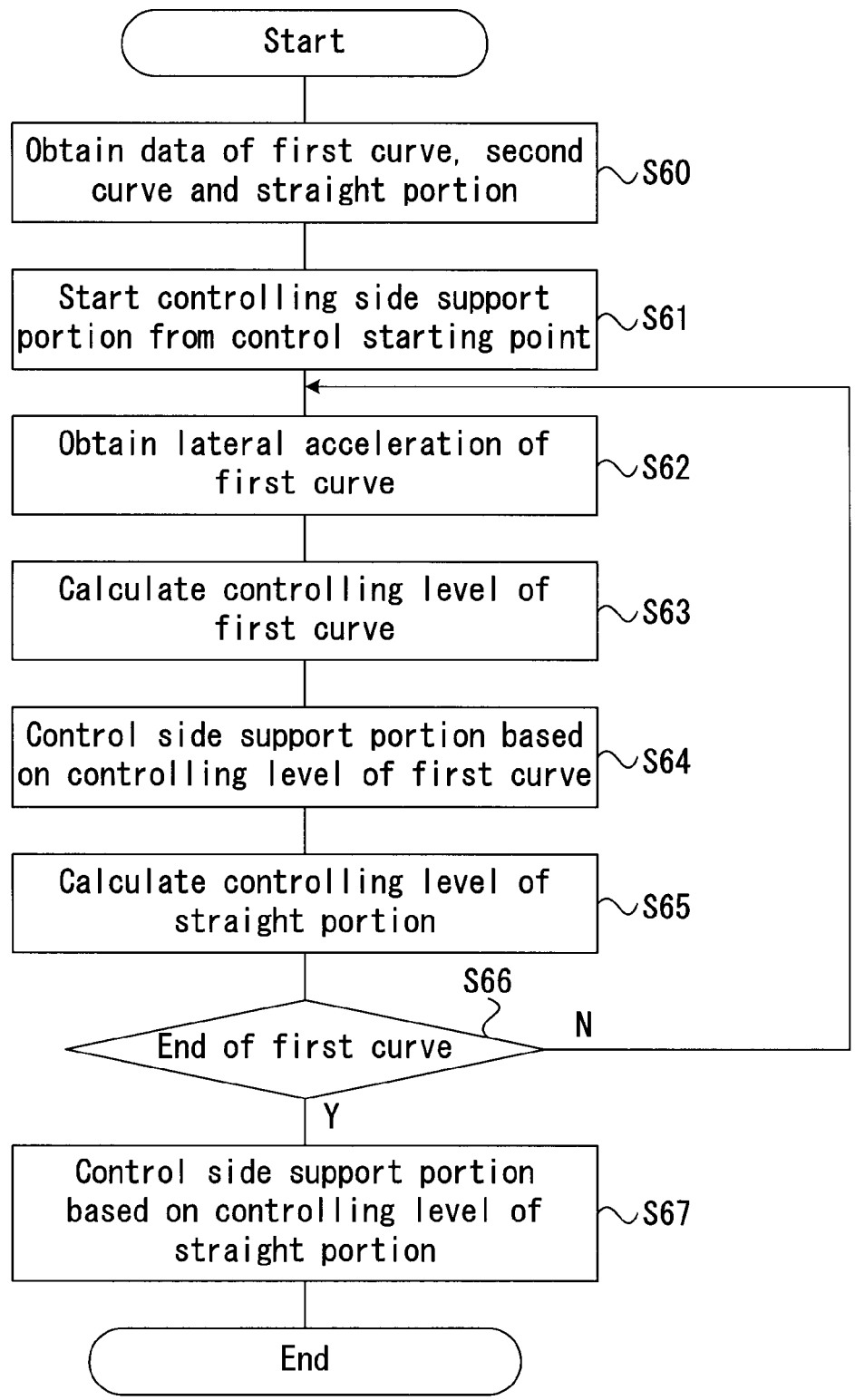
FIG. 7 illustrates a flowchart indicating the control program cooperating with the car navigation system according to the seat apparatus of the embodiment.

The retaining control of each of the right and left side support portions 16 and 17 will be explained in accordance with a flowchart of the control program cooperating with the car navigation system illustrated in FIG. 7. The control program cooperating with the car navigation system is administrated by the retaining control administrating program explained above and repeatedly executed every predetermined time.

Once the control program cooperating with the car navigation system is executed, firstly, the side support ECU 20 obtains data of the first curve C31, the second curve C32 and the straight portion L31 and the like from the car navigation system 21 in Step S60. In particular, the side support ECU 20 sequentially receives information on a radius of a curve, which is located at a predetermined distance ahead of the moving direction of the vehicle, from the car navigation system 21. Therefore, for example, when the vehicle moves to a point where a predetermined distance before the ending point P37 of the second curve C32, the side support ECU 20 gains information of the curve radius and the like up to the ending point P37 of the second curve C32. The side support ECU 20 calculates the control starting point P31, the starting point P32 of the first curve C31, the minimum radius point P33 of the first curve C31, the curve radius of the first curve C31, the ending point P34, the starting point P35 of the second curve C32, the minimum radius point P36 of the second curve C32, the curve radius of the second curve C32, the ending point P37 and a straight distance 1 of the straight portion L31 based on the information received by the side support ECU 20 in the above-mentioned manner.

Figure 8:
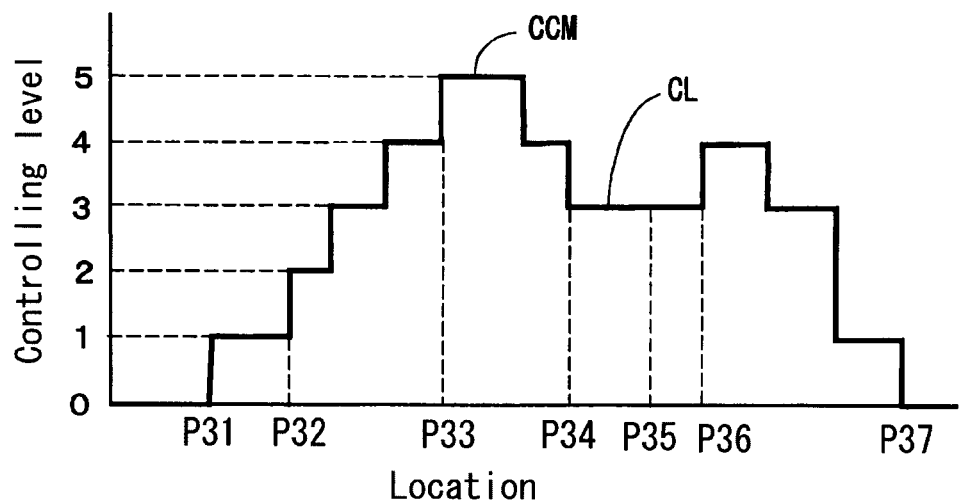
FIG. 8 illustrates a graph indicating a control level of a side support portion controlled on the basis of the control cooperating with the car navigation system in a case where a distance of a straight portion is set to between 51 m and 150 m.

As illustrated in FIG. 8, the side support ECU 20 starts controlling the right and left side support portions 16 and 17 in Step S61 when the vehicle reaches the control starting point P31. The control starting point P31 is positioned two seconds before the starting point P32 of the first curve C31. Furthermore, the driving signals are inputted to the right and the left motors 26 and 27 from the side support ECU 20, and the feedback signals are inputted to the side support ECU 20 from the right and the left rotary encoders 28 and 29 in order to control the right and the left side support portions 16 and 17 so as to be moved to the opening and the closing positions. Hence, because the side support ECU 20 starts controlling the right and the left side support portions 16 and 17 at the control starting point P31, the right and the left side support portions 16 and 17 are prevented from being suddenly moved to a closed position, so that the occupant may not feel sudden supporting operation. Additionally, as illustrated in FIG. 8, a controlling level of each side support portion 16 and 17 includes six levels, from level 0 to level 5. However, the controlling level of the right and the left sides support portions 16 and 17 does not need to include six levels, but the controlling level may include any appropriate stages if needed.

The side support ECU 20 obtains a lateral acceleration value on the first curve C31 in Step S62. Specifically, the lateral acceleration value is an output value from the lateral acceleration sensor 23 obtained when the vehicle is driven on the first curve C31. A controlling level when the vehicle turns the curve (hereinafter referred to as controlling level of the curve), which corresponds to the controlling level of the right and the left side support portions 16 and 17 of the first curve C31, is calculated in Step S63 by the side support ECU 20 based on the lateral acceleration value. However, the controlling level of the right and the left side support portions 16 and 17 within a distance from the starting point P32 of the first curve C31 to the minimum radius point P33 is determined only on the basis of the lateral acceleration value. On the other hand, the controlling value of the right and the left side support portions 16 and 17 within a distance from the minimum radius point P33 to the ending point P34 on the first curve C31 is determined on the basis of the lateral acceleration value and a controlling level of the straight portion (hereinafter referred to as straight portion controlling level CL), which will be described in detail below. In other words, the controlling level of the right and the left side support portions 16 and 17 within a distance from the minimum radius point P33 to the ending point P34 on the first curve C31 is determined so as not to be lower than the straight portion controlling level CL, considering the lateral acceleration value.

As illustrated in FIG. 8, in Step S64, within a distance from the starting point P32 to the ending point P34 on the first curve C31, the right and the left side support portions 16 and 17 are controlled by the side support ECU 20 based on the calculated controlling level of the curve. The right and the left side support portions 16 and 17 are operated by outputting the driving signals to the right and the left motors 26 and 27 from the side support ECU 20 and by inputting the feedback signals to the side support ECU 20 from the right and the left rotary encoders 28 and 29.

The straight portion controlling level CL of the straight portion L31 is calculated within a distance from the starting point P32 on the first curve C31 to the minimum radius point P33 in Step S65. Specifically, each time when Step S65 is executed, a latest straight portion controlling level CL is calculated based on the controlling level of each curve, and the side support ECU 20 compares the latest straight portion controlling level CL to the memorized straight portion controlling level CL. Then side support ECU 20 determines a larger calculated value as the straight portion controlling level CL. In the above-mentioned manner, the calculated value corresponding to a maximum controlling level of the curve CCM is determined as the straight portion controlling level CL before the vehicle reaches the minimum radius point P33. Therefore, the calculated value corresponding to the lateral acceleration value on the minimum radius point P33 may be or may not be determined as the straight portion controlling level CL.

The straight portion controlling level CL is obtained by multiplying the controlling level of the curve by a supporting rate a indicated in Table 1. In this regard, however, the calculated level is rounded to the nearest whole number. Specifically, the calculated level is rounded up if the next digit (after the decimal point) is 5 or more, and rounded down if the next digit (after the decimal point) is 4 or less.

TABLE 1

| Distance of the straight portion | Supporting rate $\alpha$ |
| --- | --- |
| 50 m or less | 1 |
| 51 m to 150 m | 0.5 |
| 151 m or grater | 0 |

A graph illustrated in FIG. 8 indicates the straight portion controlling level CL in the circumstances where the vehicle is driven on the straight portion L31 extending from 51 to 150 meters, the supporting rate $\alpha$ is set to 0.5, and the controlling level of a maximum curve CCM is set to level 5. Hence, the controlling level of the maximum curve CCM is calculated by multiplying the controlling level of the maximum curve CCM 5 by the supporting rate a 0.5. In this regard, however, the calculated the straight portion controlling level CL is rounded up if the next digit (after the decimal point) is 5 or more, and rounded down if the next digit (after the decimal point) is 4 or less. Consequently, in Step S67 described below, the right and the left side support portions 16 and 17 are controlled to support the human body at the level 3 of the straight portion controlling level CL while the vehicle is driven on the straight portion L31.

Figure 9:
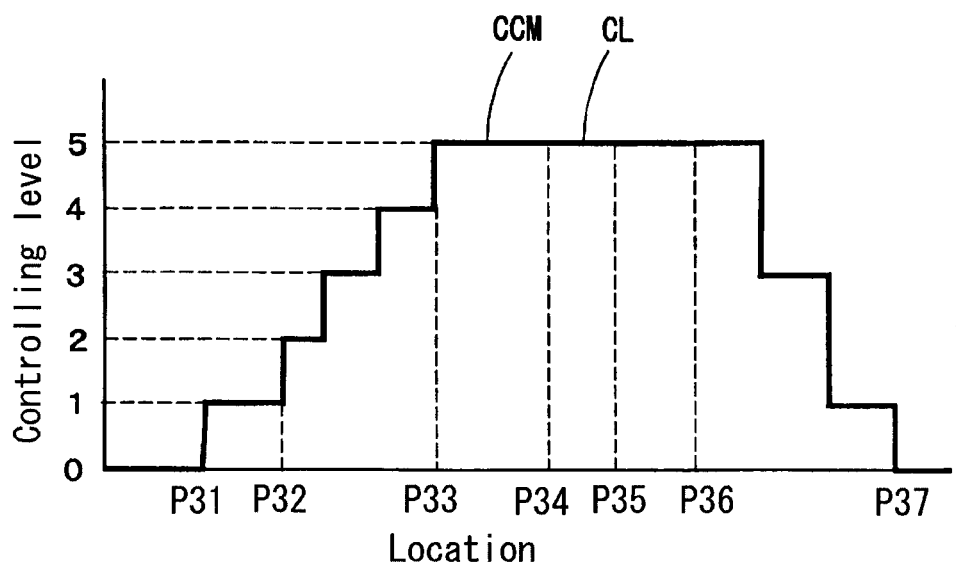
FIG. 9 illustrates a graph indicating a control level of the side support portion controlled on the basis of the control cooperating with the car navigation system in a case where a distance of a straight portion is set to be 50 m or less.

A graph illustrated in FIG. 9 indicates the straight portion controlling level CL in the circumstances where the vehicle is driven on the straight portion L31 extending equal to or less than 50 meters, the supporting rate $\alpha$ is 1, and the controlling level of the maximum curve CCM is set to level 5. Hence, the controlling level of the maximum curve CCM is set to level 5, which is calculated by multiplying the controlling level of the maximum curve CCM 5 by the supporting rate $\alpha$1. Consequently, in Step S67 described below, the right and the left side support portions 16 and 17 are controlled to support the human body at the level 5 of the straight portion controlling level CL while the vehicle is on the straight portion L31.

Figure 10:
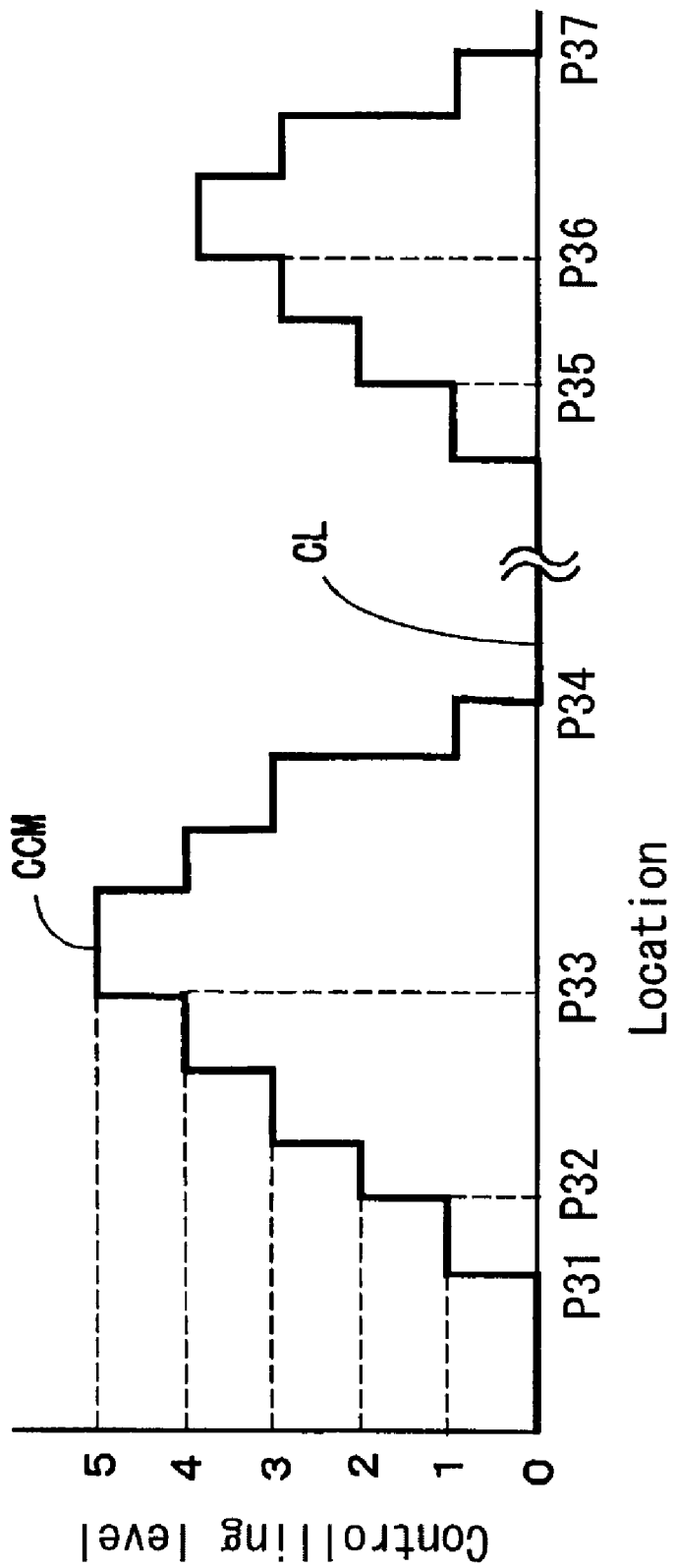
FIG. 10 illustrates a graph indicating a control level of the side support portion controlled on the basis of the control cooperating with the car navigation system in a case where a distance of a straight portion is set to be 151 m or greater.

A graph illustrated in FIG. 10 indicates the straight portion controlling level CL in the circumstances where the vehicle is driven on the straight portion L31 extending equal to or more than 151 meters, the supporting rate $\alpha$ is set to 0, and the controlling level of the maximum curve CCM is set to level 5. Hence, the controlling level of the maximum curve CCM is set to level 0, which is calculated by multiplying the controlling level of the maximum curve CCM 5 by the supporting rate $\alpha$0. Consequently, in Step S67 described below, the right and the left side support portions 16 and 17 are retained to positions so as to support the human body at the level 0 of the straight portion controlling level CL while the vehicle is driven on the straight portion L31.

Then, the side support ECU 20 checks the end of the first curve C31 in Step S66. Specifically, if the vehicle has reached the ending point P34 of the first curve C31 (YES), the side support ECU 20 determines that the vehicle passes the first curve C31 and then proceeds to the next Step S67. On the other hand, if the side support ECU 20 determines that the vehicle has not reach the ending point P34 of the first curve C31 (NO), the side support ECU 20 determines that the vehicle has not passed the first curve C31 and then returns to Step S62.

In Step S67, the vehicle is driven on the straight portion L31, and the right and the left side support portions 16 and 17 are controlled to retain to the positions so as to support the human body based on the controlling level of the straight portion CL. Further, in Step S67, the control program cooperating with the car navigation system is terminated. Steps S60 through S67 functions as a control means cooperating with the car navigation system.

Figure 11:
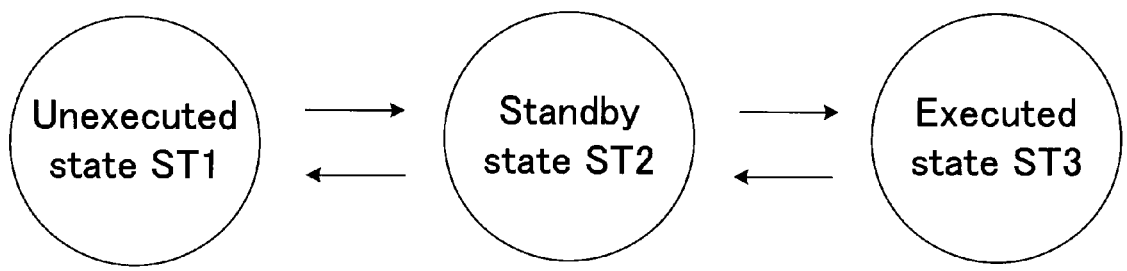
FIG. 11 illustrates a chart indicating control states in the self-directed control according to the seat apparatus of the embodiment.

Next, the self-directed control program will be explained in detail. FIG. 11 illustrates a diagram indicating a changing manner of the controlling state. The controlling state is determined on the basis of a road shape on which the vehicle is driven. The self-directed control program includes three control states; an unexecuted state ST1, a standby state ST2 and an executed state ST3. The unexecuted state ST1 is a control state where the side support ECU 20 determines that the vehicle is not driven on continuous curves, the standby state ST2 is a control state where the side support ECU 20 determines that there is a possibility that the vehicle is driven on the continuous curves, and the executed state ST3 is a control state where the side support ECU 20 determines that the vehicle is driven on the continuous curves. Further, the control state can be changed between the unexecuted state ST1 and the standby state ST2, and between the standby state ST2 and the executed state ST3. The control state cannot be changed from the unexecuted state ST1 directly to the executed state ST3, and from the executed state ST3 directly to the unexecuted state ST1. In other words, the control state can be changed between the unexecuted state ST1 and the executed state ST3 via the standby state ST2.

Figure 12:
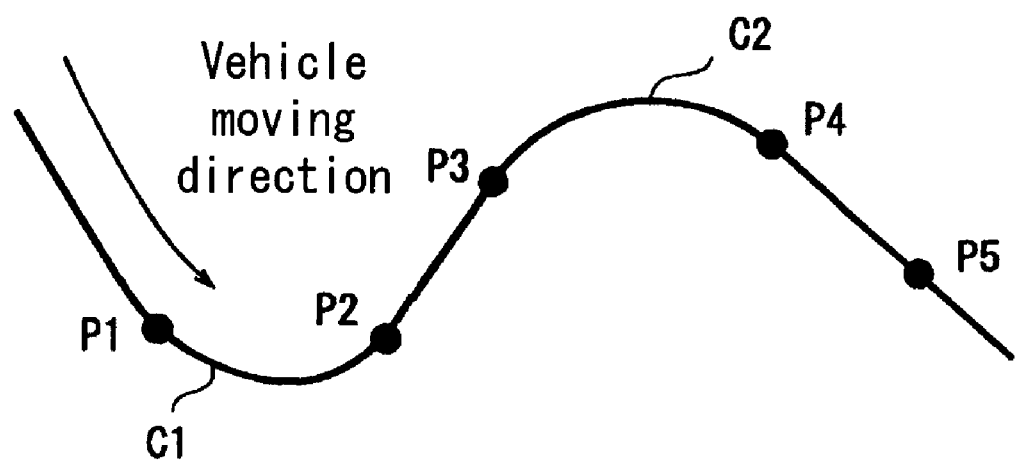
FIG. 12 illustrates a diagram indicating a road on which the vehicle is driven on the basis of a self-directed control according to the seat apparatus of the embodiment.

It is assumed that a vehicle is driven on a road illustrated in FIG. 12 in a vehicle moving direction indicated with an arrow. In FIG. 12, P1 indicates a starting point of a curve C1, P3 indicates a starting point of a curve C2, P2 indicates an ending point of the curve C1, and P4 indicates an ending point of the curve C2. Other portions of the road straight portions. When the vehicle is driven on the curve C2, the curve C1 is indicated as a previous curve, the ending point P2 is indicated as an ending point of the previous curve, the curve C2 is indicated as a current curve, the starting point P3 is indicated as a starting point of the current curve, and a distance between the ending point P2 of the previous curve C1 and the starting point P3 of the current curve C2 is indicated as a distance between the curves. On the other hand, when the vehicle is passing a point P5 of the straight portion, the point P5 is indicated as a current position of the vehicle, the curve C2 is indicated as a previous curve, the ending point P4 is indicated as an ending point of the previous curve, the distance between the ending point P4 of the previous curve C2 and the current position P5 or a distance between the starting point of the standby state ST2 on the straight portion and the current position P5 is indicated as a straight portion driving distance.

The retaining control of each of the right and left side support portions 16 and 17 will be explained in accordance with a flowchart of the self-directed control program illustrated in FIG. 13. The self-directed control program is administrated by the abovementioned retaining control administrating program and is repeatedly executed each predetermined time while the retaining control administrating program uses the self directed control program.

When the self-directed control program is executed, in Step S1, the side support ECU 20 determines whether or not the vehicle is driven on the curve C2. At this point, the starting point P3 of the curve C2 is determined on the basis of a lateral acceleration detected by the lateral acceleration sensor 23. Instead of the lateral acceleration sensor 23, the starting point P3 may be detected on the basis of the lateral acceleration calculated using a steering angle detected by the steering angle sensor 24 and a vehicle speed detected by the vehicle speed sensor 22. If the side support ECU 20 determines that the vehicle is driven on the curve C2 (YES), the side support ECU 20 proceeds to Step S2, and if the side support ECU 20 determines that the vehicle is not driven on the curve C2 (NO), the side support ECU 20 proceeds to Step S3. After Step S2 and Step S3, the self-directed control program is terminated.

Figure 14:
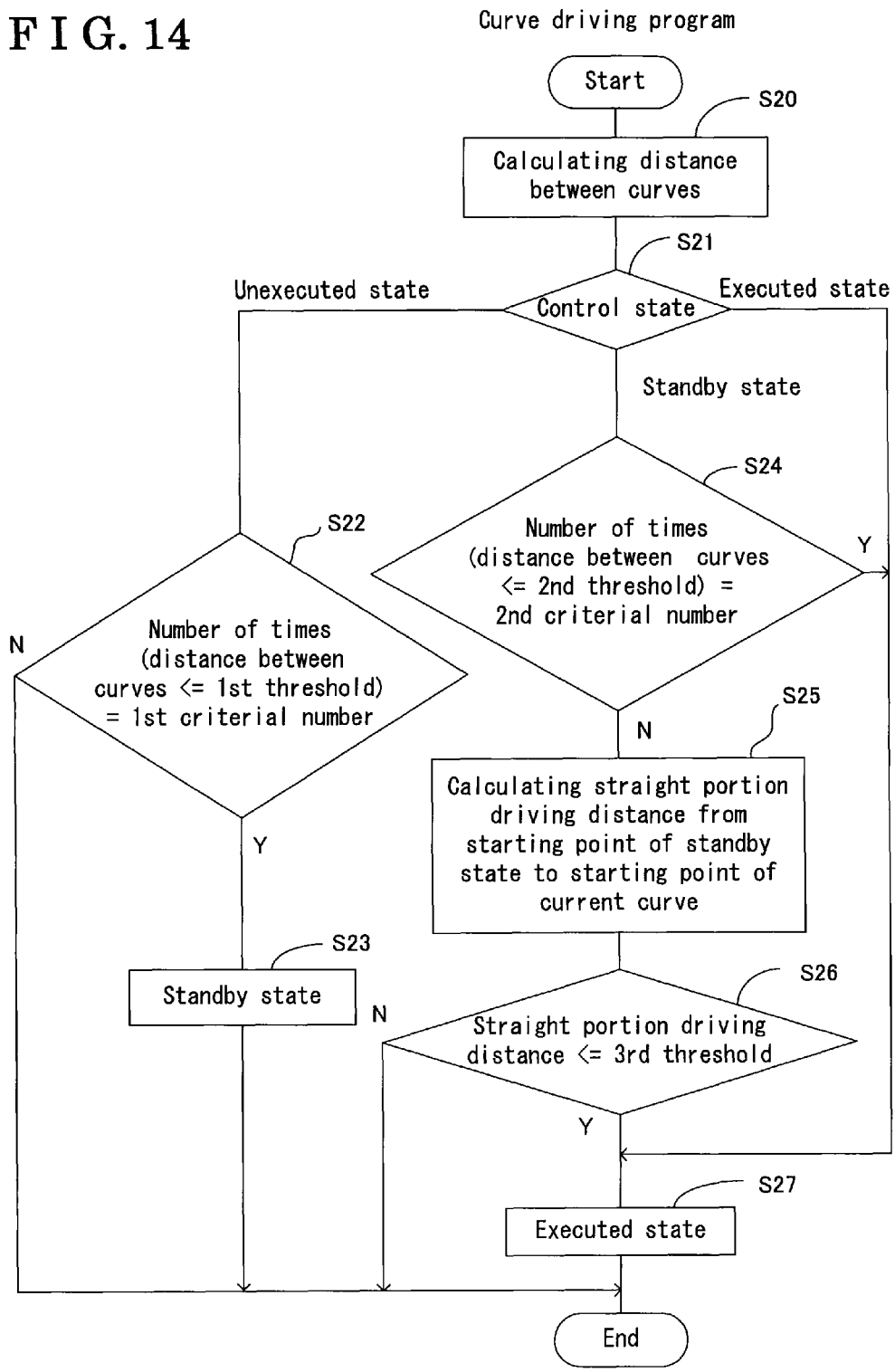
FIG. 14 illustrates a flowchart indicating a curve driving program according to the seat apparatus of the embodiment.

In Step S2, a curve driving program indicated by a flowchart illustrated in FIG. 14 is executed. In this case, the curve C1 indicates a previous curve, the ending point P2 indicates an ending point o the previous curve, the curve C2 indicates a current curve, the starting point P3 indicates a starting point of the current curve, and a distance between the ending point P2 of the previous curve C1 and the starting point P3 of the current curve C2 indicates a distance between the curves. When the curve driving program is executed, in Step S20, the side support ECU 20 calculates a distance between the curves, specifically, the side support ECU 20 calculates a distance between the ending point P2 of the previous curve C1 and the starting point P3 of the current curve C2. The distance between the curves is calculated on the basis of the vehicle speed and a driving time detected by the vehicle speed sensor 22. Hereinafter, the distance is calculated on the basis of the vehicle speed and the driving time detected by the vehicle speed sensor 22. Step S20 serves as a distance between curves calculating means.

In Step S21, the side support ECU 20 checks a current control state. If the current control state is the unexecuted state ST1, the side support ECU 22 proceeds to Step S22, if the current control state is the standby state ST2, the side support ECU 20 proceeds to Step S24, and if the side support ECU 20 is the executed state ST3, the side support ECU 20 proceeds to Step 27.

In Step S22, the side support ECU 20 detects a case where the distance between the curves calculated in Step S20 is a first threshold or less, calculates a number of the continuous detections, and determines whether or not the number of detections reaches a first criterial number. If the side support ECU 20 determines that the number of the continuous detections reaches the first criteria number (YES), the side support ECU 20 proceeds to Step S23. On the other hand, if the side support ECU 20 determines that the number of the continuous detections does not reach the first criterial number (NO), the side support ECU 20 terminates the curve driving program.

In Step S23, the side support ECU 20 sets the control state to the standby state ST2 and terminates the curve driving program. This example corresponds to a case where the vehicle is driven on the current curve C2, after the vehicle, which was in the unexecuted state ST1, was driven on the continuous curves for the first criterial number, the continuous curves being connected by a distance between the curves that is the first threshold or less. For example, if "2" is set to the first criterial number, this example corresponds to a case where the vehicle is driven on the current curve C2, after the vehicle, which was in the unexecuted state ST1, was driven on the continuous curves two times.

In Step S24, the side support ECU 20 detects a case where the distance between the curves calculated in Step S20 is a second threshold or less, calculates a number of the continuous detections, and determines whether or not the number of detections reaches a second criterial number. If the side support ECU 20 determines that the number of the continuous detections reaches the second criteria number (YES), the side support ECU 20 proceeds to Step S27. This example corresponds to a case where the vehicle is driven on the current curve C2, after the vehicle, which was in the standby state ST2, was driven on the continuous curves for the second criterial number, the continuous curves being connected by a distance between the curves that is the second threshold or less. For example, if "2" is set to the second criterial number, this example corresponds to a case where the vehicle is driven on the current curve C2, after the vehicle, which was in the standby state ST2, was driven on the continuous curves two times. On the other hand, if the side support ECU 20 determines that the number of the continuous detections does not reach the second criterial number of times (NO), the side support ECU 20 executes Step S25. In this configuration, because the second threshold is set to be larger than the first threshold, the control state changes from the unexecuted state ST1 to the standby state ST2 easier than changing from the standby state ST2 to the executed state ST3. Thus, the continuous curves can surely be detected.

In Step S25, the side support ECU 20 calculates the straight portion driving distance from the starting point of the standby state ST2 to the starting point P3 of the current curve C2. In Step S26, the side support ECU 20 determines whether or not the calculated straight portion driving distance is a third threshold or less. If the straight portion driving distance is the third threshold or less (YES), the side support ECU 20 proceeds to Step S27. This example corresponds to a case where, the vehicle is driven on the current curve C2, after the vehicle, which was in the standby state ST2 on the straight portion, was driven for the straight portion driving distance being the third threshold or less. On the other hand, if the straight portion driving distance is larger than the third threshold (NO), the side support ECU 20 terminates the curve driving program.

In Step S27, the side support ECU 20 sets the control state to the executed state ST3. Then, when the vehicle is driven on the straight portion between the curves, each of the right and left side support portions 16 and 17 are retained to a supporting position by each of the right and left motors 26 and 27. Hereinafter, "retaining the supporting position" indicates that the right and left side support portions 16 and 17 are retained to the supporting positions when the vehicle is driven on the straight portion between the curves. At this point, each the right and left side supporting portions 16 and 17 is retained to a maximum supporting position during the executed state ST3. Specifically, the right and left side support portions 16 and 17 are controlled so as to be opened/closed on the basis of a lateral acceleration detected by the lateral acceleration sensor 23 by following a program (not illustrated). Then, on the basis of the curve driving program and a straight portion running program, which will be explained later, when the control state is set to the executed state ST3, the right and left side support portions 16 and 17 are operated in a direction where the control level increases. As a result, each of the right and left side support portions 16 and 17 is retained to the maximum supporting position during the executed state ST3. After the execution in Step S27 the curve driving program is terminated. On the curve driving program and the straight portion running program, during the unexecuted state ST1 and the standby state ST2, the right and left side support portions 16 and 17 are not retained to the supporting positions and are controlled so as to be opened/closed on the basis of the lateral acceleration detected by the lateral acceleration sensor 23 by following a program (not illustrated).

Figure 13:
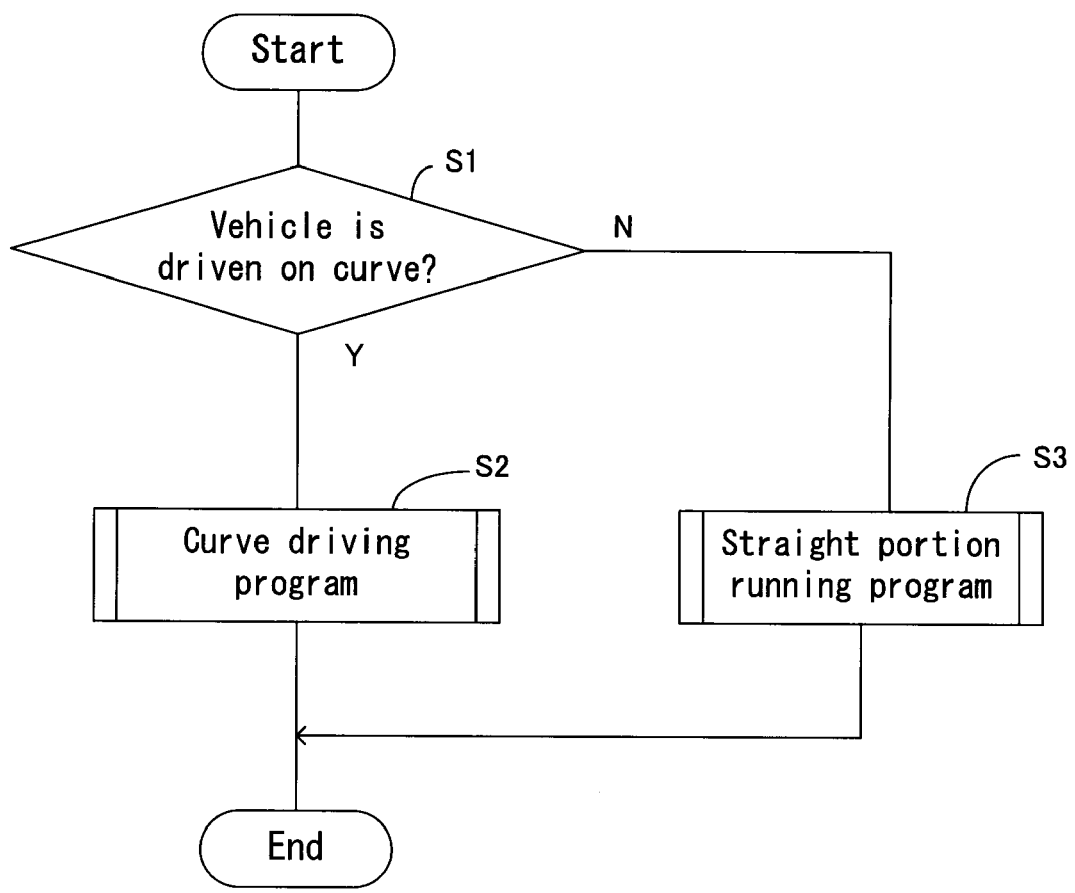
FIG. 13 illustrates a flowchart indicating the self-directed control program according to the seat apparatus of the embodiment.
Figure 15:
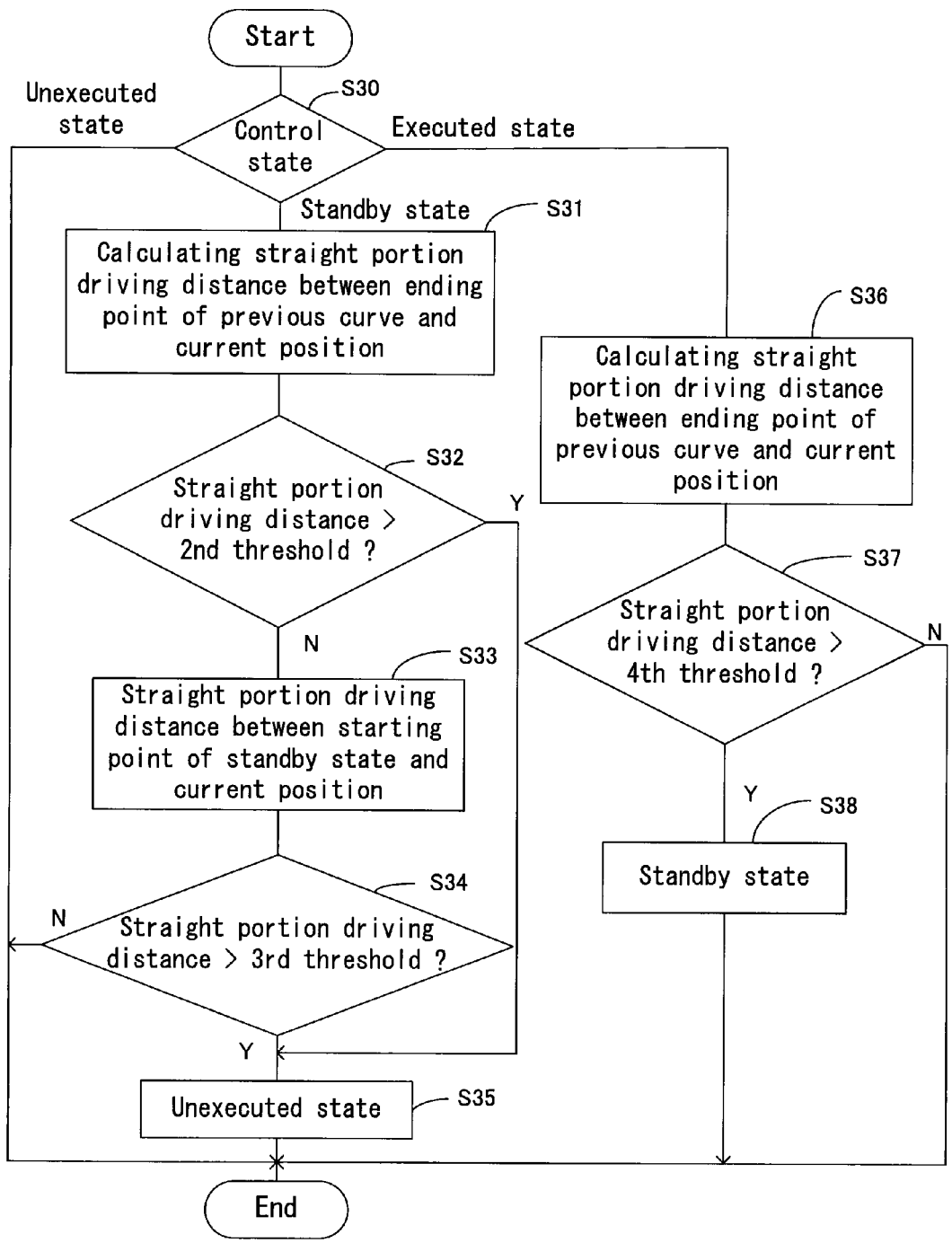
FIG. 15 illustrates a flowchart indicating a straight portion running program according to the seat apparatus of the embodiment.

In Step S3 of the flowchart illustrated in FIG. 13, the straight portion running program, which is indicated by the flowchart illustrated in FIG. 15, is executed. At this point, the point P5 is a current position, the curve C2 is a previous curve, the ending point P4 is an ending point of the previous curve, a distance between the ending point P4 of the previous curve C2 and the current position P5, or a distance between the starting point of the standby state ST2 and the current position P5 is a straight portion driving distance. Once the straight portion running program is executed, the side support ECU 20 checks a current control state in Step S30. If the current control state is set to the unexecuted state ST1, the straight portion running program is terminated. If the current control state is set to the standby state ST2, the side support ECU 20 proceeds to Step S31. If the current control state is set to the executed state ST3, the side support ECU 20 proceeds to Step S36.

In Step S31, the side support ECU 20 calculates a distance between the ending point P4 of the previous curve C2 and the current position P5 during the standby state ST2.

Then, the side support ECU 20 proceeds to Step S32. In Step 32, the side support ECU 20 determines whether or not the calculated straight portion driving distance is larger than the second threshold. If the straight portion driving distance is larger than the second threshold (YES), the side support ECU 20 proceeds to Step S35. This example corresponds to a case where the control state is set to the standby state ST2 while the vehicle was driven on the previous curve C2, and the straight portion driving distance between the ending point P4 of the previous curve C2 and the current position P5 is larger than the second threshold. On the other hand, if the straight portion driving distance is the second threshold or less (NO), the side support ECU 20 proceeds to Step S33.

In Step S33, the side support ECU 20 calculates the straight portion driving distance between the starting point of the standby state ST2 and the current position P5. Then, the side support ECU 20 proceeds to Step S34. In Step S34, the side support ECU 20 determines whether or not the straight portion driving distance is larger than the third threshold. If the straight portion driving distance is larger than the third threshold (YES), the side support ECU 20 proceeds to Step S35. This example corresponds to a case where the control state is set to the standby state ST2 while the vehicle is driven on the straight portion, and the straight portion driving distance between the starting point of the standby state ST2 and the current position P5 is larger than the third threshold. On the other hand, if the straight portion driving distance is the third threshold or less (NO), the straight portion running program is terminated.

In Step S35, the side support ECU 20 sets the control state to the unexecuted state ST1 and terminates the straight portion running program In Step S36, the side support ECU 20 calculates the straight portion driving distance between the ending point P4 of the previous curve C2 and the current position P5 during the executed state ST3. Then the side support ECU 20 proceeds to Step S37. In Step S37, the side support ECU 20 determines whether or not the straight portion driving distance is larger than the fourth threshold. If the straight portion driving distance is larger than the forth threshold (YES), the side support ECU 20 proceeds to Step S38. This example corresponds to a case where the control state is set to the executed state ST3 while the vehicle was driven on the previous curve C2, and the straight portion driving distance between the ending point P4 of the previous curve C2 and the current position P5 is larger than the fourth threshold. On the other hand, if the straight portion driving distance is the fourth threshold or less (NO), the straight portion running program is terminated. This example corresponds to a case where the control state has been maintained to the executed state ST3, and each of the right and left side support portions 16 and 17 is retained to the supporting position.

In Step S38, the side support ECU 20 sets the control state to the standby state ST2, and the right and left side support portions 16 and 17, which has been retained to the supporting position, is released, and then the straight portion running program is terminated. Steps S1 through S3, S20 through S27, and S30 through S38 each functions as a self-directed control means.

FIGS. 16A, 16B and 16C illustrates an example when the self-directed control program is executed. Specifically, FIG. 16A illustrates a graph G1 indicating a relation between the vehicle running distance and the lateral acceleration, FIG. 16B illustrates graphs G2 and G3 each indicating a relation between the vehicle running distance and the control state, and FIG. 16C illustrates a graph G4 indicating a relation between the vehicle running distance and the control level. The control level includes five levels from level 0 to level 4. In FIGS. 16A, 16B and 16C, each of C10 through C14 indicates a curve (curves C10, C11, C12, C13 and C14), and P10 indicates a starting point of the curve C10, P12 indicates a starting point of the curve C11, P14 indicates a starting point of the curve C12, P17 indicates a starting point of the curve C13, and P19 indicates a starting point of the curve C14. Further, P11 indicates an ending point of the curve C10, P13 indicates an ending point of the curve C11, P15 indicates an ending point of the curve C12, P18 indicates an ending point of the curve C13, and P20 indicates an ending point of the curve C14. Furthermore, P0 indicates a point where the vehicle starts moving, and when the vehicle is positioned at the point P0, the control state is in the unexecuted state ST1. The first criterial number is set to "1", the second criterial number is also set to "1", the first threshold is set to 150 m, the second threshold is set to 180 m, the third threshold is set to 150 m, and the fourth threshold is set to 150 m. Further, a straight portion L10 exists between the ending point P11 and the starting point P12, a straight portion L11 exists between the ending point P13 and the starting point P14, a straight portion L12 exists between the ending point P15 and a point P16, a straight portion L13 exists between the point P16 and the starting point P17, a straight portion L14 exists between the ending point P18 and the starting point P19, a straight portion L15 exists between the ending point P20 and a point P21, and a straight portion L16 exists between the point P21 and a point P22. Furthermore, a distance of the straight portion L10 is set to 120 m, a distance of the straight portion L11 is set to 160 m, a distance of the straight portion L12 is set to 170 m, a distance of the straight portion L13 is set to 130 m, a distance of the straight portion L14 is set to 130 m, a distance of the straight portion L15 is set to 150 m and a distance of the straight portion L16 is set to 150 m.

When the vehicle moving from the point P0 is driven on the curve C10, because the distance between the curves does not exist, the control state is set to the unexecuted state ST1. As indicated by the graph G4, while the vehicle is driven, the right and left side support portions 16 and 17 are controlled so as to be opened/closed on the basis of the lateral acceleration detected by the lateral acceleration sensor 23 following a program (not shown). While the vehicle is driven on the curve C11, the side support ECU 20 determines in Step S22 that the distance between the curves (120 m), which is the distance of the straight portion L10, is less than the first threshold (150 m). Then, the control state is set to the standby state ST2 in Step S23.

While the vehicle is driven on the curve C12, the side support ECU 20 determines in Step S24 that the distance between the curves (160 m), which is the distance of the straight portion L11, is less than the second threshold (180 m). Then, the control state is set to the executed state ST3 in Step S27. Then, on the straight portion L12, each of the right and left side support portions 16 and 17 is retained to the supporting position at a level illustrated in the graph G4. Thus, because the second threshold (180 m) is set to be larger than the first threshold (150 m), the control state is changed from the standby state ST2 to the executed state ST3 more smoothly than the case where the control state is changed from the unexecuted state ST1 to the standby state ST2, and the continuous curves are surely detected.

When the vehicle reaches the point P16, the side support ECU 20 determines in Step S37 that the straight portion driving distance (170 m), which is the distance between the ending point P15 of the previous curve C12 and the current position P16, is larger than the fourth threshold (150 m). Then, the control state is set to the standby state ST2 in Step S38. Then, as indicated by the graph G4, each of the right and left side support portions 16 and 17, which has been retained to the supporting position, is released.

While the vehicle is driven on the curve C13, the side support ECU 20 determines in Step S26 that the straight portion driving distance (130 m), which is the distance between the starting point P16 of the standby state ST2 and the starting point P17 of the curve C13, is less than the third threshold (150 m). Then, the control state is set to the executed state ST3 in Step S27. On the straight portion L14, each of the right and left side support portion 16 and 17 is retained to the supporting position at a level indicated by the graph G4. The dashed line in the graph G3 indicates a control state, which is set only to the unexecuted state ST1 or the executed state ST3, not to the standby state ST2. In this case, if the side support ECU 20 detects that the vehicle has passed two continuous curves, the control state being the unexecuted state ST1 is changed to the executed state ST3. When the controls state is not set to the standby state ST2 as indicated in the graph G3, because the control state is changed to the executed state ST3 only when the vehicle reaches the starting point P19 of the curve C14, the right and left side support portions 16 and 17 are not retained to the supporting position on the straight portion L14. On the other hand, according to the seat apparatus in the embodiment, because the control state is set to the unexecuted state ST1, the standby state ST2 or the executed state ST3, in case that the straight portions L12 and L13, whose distances are relatively long, exist in the continuous curves, the control state is set to the standby state ST2 on the straight portion L12, and then the control state is changed to the executed state ST3 at the star point P17 of the curve C13. Thus, as indicated by the graph G4, each of the right and left side support portions 16 and 17 is rapidly retained to the supporting position when the vehicle is driven on the straight portion L14.

When the vehicle is driven on the curve C14, the side support ECU 20 proceeds to Step S21 and then proceeds to Step S27. In Steps S21 and S27, the control state is maintained to the executed state ST3. Then, when vehicle is driven on the straight portion L15, each of the right and left side support portions 16 and 17 is retained to the supporting position at the level indicated by the graph G4. After the vehicle passes the point P21, the side support ECU 20 determines in Step 37 that the straight portion driving distance (150 m), which is a distance of the straight portion L15 between the ending point P20 of the previous curve C14 and the point P21, is larger than the fourth threshold (150 m). Then, the control state is set to the standby state ST2 in Step S38. Then, as illustrated in the graph G4, each of the right and left side support portions 16 and 17, which has been retained to the supporting position, is released.

After the vehicle passes the point P22, the side support ECU 20 determines in Step 34 that the straight portion driving distance (150 m), which is a distance of the straight portion L16 between the ending point P21 of the standby state ST2 and the point P22, is larger than the third threshold (150 m). In Step S35, the control state is set to the unexecuted state ST1.

The seat apparatus adapted to vehicle for controlling a side support portion (16, 17) on the basis of a road shape, includes a control program cooperating with a car navigation system (Steps S60 through S67) for controlling the side support portion (16, 17) to be retained on the basis of electronic map data from a car navigation system (21), a self-directed control program (Steps S1 through S3, S20 through S27 and S30 through S38) for controlling the side support portion (16, 17) to be retained on the basis of vehicle driving information, a sensor error detecting means (S55, S52) for detecting a sensor output error from the car navigation system (21), and a map matching error detecting means (S55, S52) for detecting that a map matching error occurs at the car navigation system (21), wherein, while the side support portion (16, 17) is controlled so as to be retained by the control program cooperating with the car navigation system (Steps S60 through S67), when at least one of the sensor error detecting means (S55, S52) and the map matching error detecting means (S55, S52) detects the error, the side support portion (16, 17) controlled by the control program cooperating with the car navigation system (Steps S60 through S67) is changed to be controlled by the self-directed control program (Steps S1 through S3, S20 through S27 and S30 through S38), and while the side support portion (16, 17) is controlled so as to be retained by the self-directed control program (Steps S1 through S3, S20 through S27 and S30 through S38), when one of the sensor error detecting means (S55, S52) and the map matching error detecting means (S55, S52) does not detect the error, the side support portion (16, 17) controlled by the self-directed control program (Steps S1 through S3, S20 through S27 and S30 through S38) is changed to be controlled by the control program cooperating with the car navigation system (Steps S60 through S67).

According to the seat apparatus of the embodiment, during a normal operation, the right and left side support portions 16 and 17 are controlled so as to be retained to the supporting position by following the control program cooperating with the car navigation system (Steps S60 through S67). While the control program cooperating with the car navigation system is used, when the side support ECU 21 detects in Step S52 that the information from the car navigation system 21 includes errors, the control program cooperating with the car navigation system is switched to the self-directed control program (Steps S1 through S3, S20 through S27 and S30 through S38). Further, while the self-directed control program is used, when the side support ECU 21 detects in Step S55 that the information from the car navigation system 21 includes errors, the self-directed control program is switched to the control program cooperating with the car navigation system. Thus, according to the seat apparatus, because the retaining control administrating program determines which control should be used (a control executed by the control program cooperating with the car navigation system or a control executed by self-directed control program) on the basis of the driving condition, even when the vehicle is driven on the continuous curves, the right and left side support portions 16 and 17 are stably controlled.

Further, when the side support portion (16, 17) controlled by the control program cooperating with the car navigation system (Steps S60 through S67) is changed to be controlled by the self-directed control program (Steps S1 through S3, S20 through S27 and S30 through S38), a control level of the side support portion (16, 17) controlled by the self-directed control program (Steps S1 through S3, S20 through S27 and S30 through S38) is equal to or more than a control level of the side support portion (16, 17) controlled by the control program cooperating with the car navigation system (Steps S60 through S67).

According to the seat apparatus, when the control program is switched from the control program cooperating with the car navigation system to the self-directed control program, the control level of the right and left side support portions 16 and 17 controlled by the self-directed control program is equal to or more than the control level of the right and left side support portions 16 and 17 controlled by the control program cooperating with the car navigation system. Thus, the retaining control of the right and left side support portions 16 and 17 is executed without giving an uncomfortable feeling to the occupant.

Furthermore, when the side support portion (16, 17) controlled by the self-directed control program (Steps S1 through S3, S20 through S27 and S30 through S38) is changed to be controlled by the control program cooperating with the car navigation system (Steps S60 through S67), a control level of the side support portion (16, 17) controlled by the control program cooperating with the car navigation system (Steps S60 through S67) is equal to or more than the control level of the side support portion (16, 17) controlled by the self-directed control program (Steps S1 through S3, S20 through S27 and S30 through S38).

According to the seat apparatus, when the control program is switched from the self-directed control program to the control program cooperating with the car navigation system, the control level of the right and left side support portions 16 and 17 controlled by the control program cooperating with the car navigation system is equal to or more than the control level of the right and left side support portions 16 and 17 controlled by the self-directed control program. Thus the retaining control of the right and left side support portions 16 and 17 is executed without giving an uncomfortable feeling to the occupant.

In the embodiment, the lateral acceleration is detected by the lateral acceleration sensor 23, however, the lateral acceleration may be calculated on the basis of a steering angle detected by the steering angle sensor 24 and a vehicle speed detected by the vehicle speed sensor 22.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A seat apparatus adapted to a vehicle and for controlling a side support portion of a seat on the basis of a road shape, the seat apparatus comprising:

control means that cooperates with a car navigation system and for controlling the side support portion of the seat on the basis of electronic map data from the car navigation system;

self-directed control means for controlling the side support portion of the seat on the basis of vehicle driving information;

sensor error detecting means for detecting a sensor output error from the car navigation system; and map matching error detecting means for detecting that a map matching error occurs at the car navigation system, wherein, while the side support portion of the seat is controlled by the control means that cooperates with the car navigation system, when at least one of the sensor error detecting means and the map matching error detecting means detects at least one of the sensor output error and the map matching error, the side support portion of the seat controlled by the control means that cooperates with the car navigation system is changed to be controlled by the self-directed control means, and while the side support portion of the seat is controlled by the self-directed control means, when one of the sensor error detecting means and the map matching error detecting means does not detect the error, the side support portion of the seat controlled by the self-directed control means is changed to be controlled by the control means that cooperates with the car navigation system.

2. The seat apparatus according to claim 1, wherein, when the side support portion of the seat controlled by the control means that cooperates with the car navigation system is changed to be controlled by the self-directed control means, a control level of the side support portion of the seat controlled by the self-directed control means is equal to or more than a control level of the side support portion of the seat controlled by the control means that cooperates with the car navigation system.

3. The seat apparatus according to claim 2, wherein, when the side support portion of the seat controlled by the self-directed control means is changed to be controlled by the control means that cooperates with the car navigation system, the control level of the side support portion of the seat controlled by the control means that cooperates with the car navigation system is equal to or more than the control level of the side support portion of the seat controlled by the self-directed control means.

4. The seat apparatus according to claim 1, wherein the vehicle driving information includes a vehicle speed detected by a vehicle speed sensor.

5. The seat apparatus according to claim 1, wherein the vehicle driving information includes a lateral acceleration of the vehicle detected by a lateral acceleration sensor.

6. A seat apparatus adapted to a vehicle and for controlling a side support portion of a seat on the basis of a road shape, the seat apparatus comprising:

an electronic control unit;

a control program stored in the electronic control unit and that communicates with a car navigation system to control the side support portion of the seat on the basis of electronic map data from the car navigation system;

a self-directed control program stored in the electronic control unit and that controls the side support portion of the seat on the basis of vehicle driving information;

wherein the electronic control unit performs a sensor error detecting step of detecting a sensor output error from the car navigation system; and a map matching error detecting step of detecting that a map matching error occurs at the car navigation system, wherein, while the side support portion of the seat is controlled by the control program that communicates with the car navigation system, when at least one of the sensor error detecting step and the map matching error detecting step detects at least one of the sensor output error and the map matching error, the side support portion of the seat controlled by the control program that communicates with the car navigation system is changed to be controlled by the self-directed control program, and while the side support portion of the seat is controlled by the self-directed control program, when one of the sensor error detecting step and the map matching error detecting step does not detect the error, the side support portion of the seat controlled by the self-directed control program is changed to be controlled by the control program that communicates with the car navigation system.

* * * * *